(12) United States Patent
Heo et al.

(10) Patent No.: US 7,792,998 B2
(45) Date of Patent: Sep. 7, 2010

(54) SYSTEM AND METHOD FOR PROVIDING REAL-TIME STREAMING SERVICE BETWEEN TERMINALS

(75) Inventors: Dong-Kyu Heo, Seoul (KR); Jin-He Jung, Suwon-si (KR); Sang-Bong Lee, Suwon-si (KR); Jeong-Hoe Ku, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 276 days.

(21) Appl. No.: 12/017,893

(22) Filed: Jan. 22, 2008

(65) Prior Publication Data
US 2008/0177865 A1    Jul. 24, 2008

(30) Foreign Application Priority Data
Jan. 19, 2007   (KR)  ................... 2007-6178

(51) Int. Cl.
*G06F 15/16* (2006.01)
(52) U.S. Cl. ...................... 709/246; 219/203
(58) Field of Classification Search ............ 709/217, 709/219, 246, 203
See application file for complete search history.

(56) References Cited
U.S. PATENT DOCUMENTS
2003/0131076 A1 *   7/2003   Nelson et al. ............... 709/219

FOREIGN PATENT DOCUMENTS

| KR | 1020060057563 | 5/2006 |
|----|---------------|--------|
| KR | 10-2006-0135939 | 12/2006 |
| WO | WO 2005/109821 | 11/2005 |

* cited by examiner

*Primary Examiner*—Salad Abdullahi
(74) *Attorney, Agent, or Firm*—The Farrell Law Firm, LLP

(57) ABSTRACT

Provided is a system and method for providing a real-time streaming service between terminals by using a wired/wireless communication channel. The system for providing a real-time streaming service between terminals includes a server terminal for parsing and separately storing header information of media data, decoding and outputting each of video and audio data included in the media data, and providing header information and the media data being currently reproduced in response to a sharing request for the media data; and a client terminal for generating a decoder by means of the header information received from the server terminal according to the sharing request for the media data being reproduced in the server terminal, decoding the media data provided from the server terminal by means of the generated decoder, and outputting the media data.

7 Claims, 2 Drawing Sheets

SYSTEM AND METHOD FOR PROVIDING REAL-TIME STREAMING SERVICE BETWEEN TERMINALS

PRIORITY

This application claims priority under 35 U.S.C. §119(a) to a Korean Patent Application entitled "System And Method For Providing Real-Time Streaming Service Between Terminals" filed with the Korean Intellectual Property Office on Jan. 19, 2007 and assigned Serial No. 2007-6178, the contents of which are incorporated herein by reference.

BACKGROUND OF THE INVENTION

1. Field of the Invention

The present invention relates to a system and method for data transmission/reception, and more particularly to a system and method for providing a streaming service in real time between terminals by using a wired/wireless communication channel.

2. Description of the Related Art

Recently, mobile terminals which users can carry, such as cellular phones and Personal Digital Assistants (PDAs), have become very popular. With the development of communication technology, it becomes possible for mobile terminals to provide supplementary functions such as a game function, an alarm function, and an MP3 player function using various images and sounds, in addition to the communication functions such as a voice communication function and a Short Message Service (SMS) function. Accordingly, a user of a mobile terminal can use various convenient services as well as the voice communication function.

Additionally, recently, mobile terminals that can use a streaming service through the server of a communication provider or contents provider have been released in the market, and a Digital Multimedia Broadcasting (DMB) service is being provided through broadcasting stations to such mobile terminals capable of receiving the broadcasting service. At present, one independent mobile terminal supports a real-time streaming service for contents including both video and audio, as well as local media reproduction of the contents. Also, recent mobile terminals can use a Video On Demand (VOD) service and image communication, in addition to the DMB service, when the mobile terminals have been equipped with a predetermined module.

Furthermore, various mobile terminals equipped with a Bluetooth (hereinafter, "Bluetooth") module for near field communication between different devices, such as between mobile terminals or between a mobile terminal and a headset, have been released in the market. The user of a mobile terminal equipped with a module for near field communication, as described above, can listen to MP3 music stored in the mobile terminal using a wireless headset for near field communication, or can communicate with the user of another mobile terminal for near field communication, within a very close distance. However, while it is possible to transmit the data of single-type media, such as an MP3 file or a voice communication, through a unidirectional logical channel, it is impossible to transmit a data stream including real-time video and audio data streaming.

One possible solution to overcome the above-mentioned problem is to implement a User Datagram Protocol (UDP) layer of a packet switching form on a Bluetooth channel, and to secure a plurality of logical channels through an existing protocol, such as a Real-time Transport Protocol (RTP) or a Session Initiation Protocol (SIP), for transmission of a video, so as to enable communication. However, such a method requires too high a cost and effort for implementation thereof, i.e., a streaming service for media data sharing between mobile terminals has a limitation in simultaneously transmitting video and audio data by means of conventional streaming algorithms due to the complexity of its structure. Actually, existing mobile terminals do not support a real-time streaming service function between mobile terminals through a wired/wireless communication channel, such as a Bluetooth channel, a Universal Asynchronous Receiver/Transmitter (UART) channel, a Universal Serial Bus (USB) channel, etc.

As described above, the existing mobile terminal can be provided with a streaming service through the server of a communication provider or a content provider, and can be provided with a DMB service from a broadcasting station. In this case, especially, a streaming service provided through a communication provider requires a large expense, which puts a heavy burden on users of mobile terminals. Accordingly, there is an increasing demand for simultaneously transmitting video and audio data in real time between terminals, such as a streaming service provided between a server and a terminal, as described above.

SUMMARY OF THE INVENTION

Accordingly, the present invention has been made to solve the above-mentioned problems occurring in the prior art, and the present invention provides a system and method for simultaneously providing a real-time streaming service for the same media between terminals.

In accordance with an aspect of the present invention, there is provided a system for providing a real-time streaming service between terminals, the system including a server terminal for parsing and separately storing header information of media data, decoding and outputting each of video and audio data included in the media data, and providing header information and the media data being currently reproduced in response to a sharing request for the media data; and a client terminal for generating a decoder by means of the header information received from the server terminal according to the sharing request for the media data being reproduced in the server terminal, decoding the media data provided from the server terminal by means of the generated decoder, and outputting the media data.

In accordance with another aspect of the present invention, there is provided a method for providing a real-time streaming service between terminals in a streaming service provision system, the method including parsing and separately storing, by the server terminal, header information of media data, and decoding and outputting each of video and audio data included in the media data; when a sharing request for the media data of the server terminal is input, transmitting, by the client terminal, a sharing request message for the media data being reproduced to the server terminal; when the sharing request message for the media data is received, transmitting, by the server terminal, the header information about the media data being reproduced and the media data being currently reproduced; and generating, by the client terminal, a decoder according to the received header information, and decoding and outputting the media data provided from the server terminal by means of the generated decoder.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Figure 1:
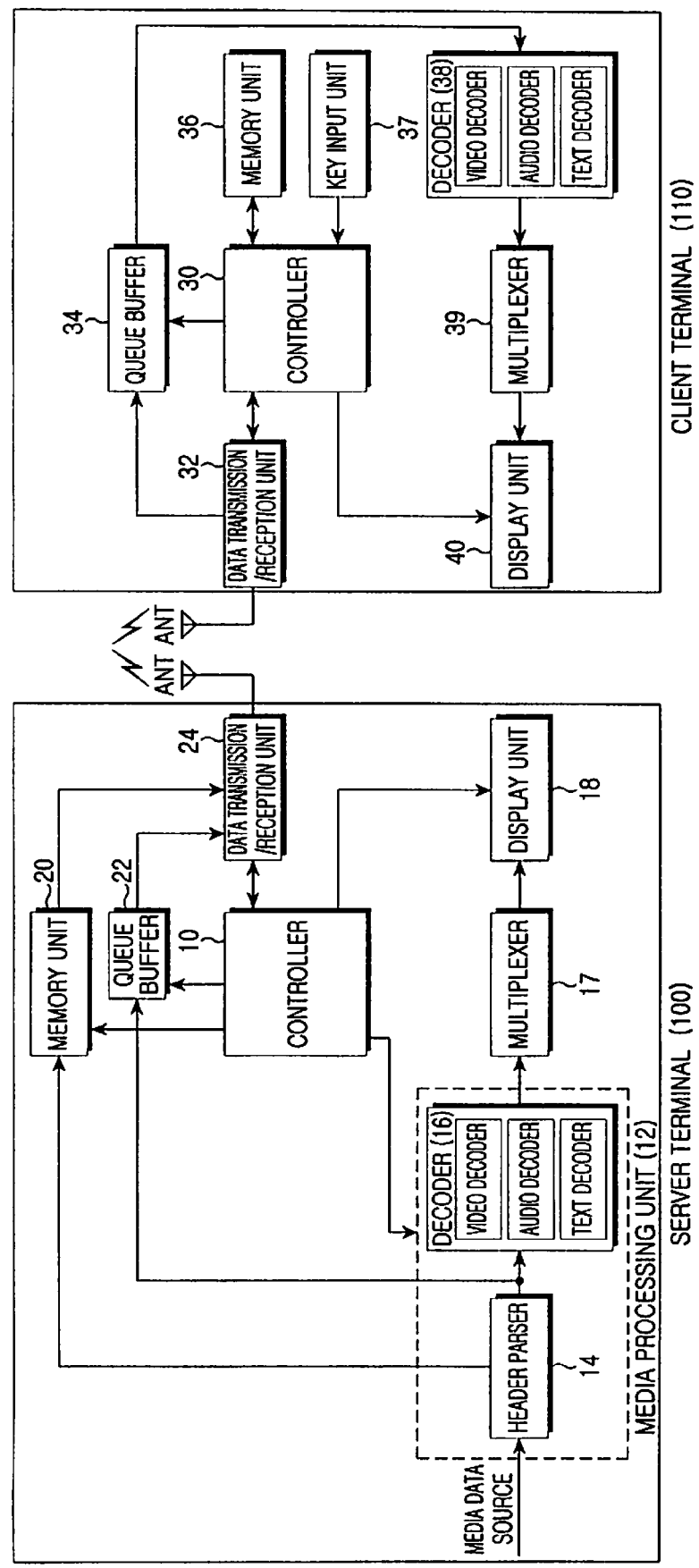
FIG. 1 is a block diagram illustrating the configuration of a system for providing a real-time streaming service from a server terminal to a client terminal according to an exemplary embodiment of the present invention.

Hereinafter, one exemplary embodiment of the present invention will be described with reference to the accompanying drawings. It is to be noted that the same elements are indicated with the same reference numerals throughout the drawings. In the following description, a detailed description of known functions and configurations incorporated herein will be omitted when it may obscure the subject matter of the present invention.

The present invention provides a method for sharing media by implementing a real-time streaming function between mobile terminals through a proper wired/wireless communication channel. The configuration of a system for providing a real-time streaming service between terminals according to an exemplary embodiment of the present invention will now be described with reference to FIG. 1.

First, a server terminal 100 reproduces predetermined media data including video and audio data, and transmits media data being reproduced to a client terminal 110 in real time. The client terminal 110 transmits a request for media data sharing to the server terminal 100 when the user selects to share media data being reproduced in the server terminal 100. Thereafter, the client terminal 110 sets an environment of a decoder according to received header information, and then can reproduce media data provided from the server terminal 100. Also, it is assumed that wired/wireless communication can be performed between the server terminal 100 and client terminal 110. Additionally, the server terminal 100 and client terminal 110 have decoders for reproducing media data, in which it is assumed that the decoders of the terminals can process the same file format and have mutually similar capabilities in a maximum number of frames which can be processed per second.

First, the server terminal 100 includes a controller 10, a media processing unit 12 containing a header parser 14 and a decoder 16, a key input unit (not shown), a display unit 18, a multiplexer 17, a data transmission/reception unit 24, a queue buffer 22, and a memory unit 20.

The controller 10 controls the components included in the server terminal 100. The controller 10 inputs a media data source, which has been received for provision of a streaming service or a broadcasting service, such as a Digital Multimedia Broadcasting (DMB) service or a Digital Video Broadcasting-Handheld (DVB-H) service, to the media processing unit 12. Also, the media data source may be media data received according to a provision of a specific service, or may be media data created by the server terminal 100 itself. The media data created by the server terminal 100 itself may include, for example, moving picture data and media data that contains voice and image data transmitted and received during image communication.

The media processing unit 12 includes the header parser 14 and the decoder 16. Among a media data source input to the media processing unit 12, as described above, only a header portion thereof is parsed through the header parser 14. Thereafter, the parsed header information is stored in the queue buffer 22 and memory unit 20. The header information stored in the queue buffer 22 is provided when a request for media data sharing is received from the client terminal 110. Also, the header information stored in the memory unit 20 is used to reproduce media data in the server terminal 100. In this case, the header information includes decoder generation information, such as a codec type of a file, a frame size, a frame rate, a number of bits per pixel, and a quantization precision.

Thereafter, the controller 10 sets the environment of the decoder 16 by a means of the decoder generation information included in the parsed header information so as to reproduce corresponding data. Then, the decoder 16 performs a decoding operation with respect to each of input video data, audio data, and text data. In this case, each decoder included in the decoder 16 extracts one encoded frame from encoded media data, decodes the extracted frame, and then outputs the decoded frame to the multiplexer 17. Then, the multiplexer 17 multiplexes decoded data input from each decoder into one image by synchronizing each type of decoded data with each other, and outputs the multiplexed data to the display unit 18, thereby reproducing the media data.

The display unit 18 displays a current state of the server terminal 100 and an operation state of the server terminal 100 according to the control of the controller 10, and generally may be constructed as a Liquid Crystal Display (LCD) or an Organic Light Emitting Diode (OLED) display.

Meanwhile, when the server terminal 100 receives a header information request message for sharing of media data being currently reproduced therein through the data transmission/reception unit 24 from the client terminal 110, the controller 10 transmits the header information stored in the queue buffer 22 to the client terminal 110 through the data transmission/reception unit 24.

In this case, the data transmission/reception unit 24 modulates the header information and media data into a digital radio signal and transmits the digital radio signal through an antenna, and demodulates a signal received through the antenna and transfers the demodulated signal to the controller 10.

Also, when the server terminal 100 receives a message requesting media data being currently reproduced from the client terminal 110, the server terminal 100 extracts information about a frame being currently reproduced, and then transmits media data being reproduced to the client terminal 110 together with the extracted frame information. In this case, the transmitted media data is transferred in units of encoded frames.

Hereinafter, the configuration of the client terminal 110 which can reproduce the same media data as the server terminal 100 by using header information and media data, which have been transmitted from the server terminal 100, will be described. The client terminal 110 includes a controller 30, a data transmission/reception unit 32, a queue buffer 34, a memory unit 36, a decoder 38, and a display unit 40.

First, the controller 30 controls the components included in the client terminal 110. When receiving an input for a media data sharing request to the server terminal 100 by the user, the controller 10 transmits a message for requesting header information about media data being currently reproduced in the server terminal 100 through the data transmission/reception unit 32 to the server terminal 100.

Thereafter, when receiving header information through the data transmission/reception unit 32, the controller 30 stores the header information in the queue buffer 34, checks decoder generation information included in the header information, and sets a decoder environment according to the checked decoder generation information. In this case, the client terminal 110 sets a decoder environment by using the decoder generation information received from the server terminal 100. Through such an operation, the client terminal 110 has the same decoding environment as the server terminal 100, thereby forming an environment to reproduce the same media data as the server terminal 100. Also, when the decoder environment has been set, the controller 30 transmits a message requesting media data being currently reproduced in the server terminal 100 through the data transmission/reception unit 32 to the server terminal 100.

Also, when receiving encoded media data and current frame position information through the data transmission/reception unit 32, the controller 30 first stores the received media data in the queue buffer 34. In this case, while sharing media data with the server terminal 100, the controller 30 continuously receives media data through the data transmission/reception unit 32 from the server terminal 100. In this case, since media data transmitted from the server terminal 100 is transmitted in units of frames, the client terminal 110 stores the received media data in units of frames in the queue buffer 34.

Thereafter, the controller 30 checks the received current frame position information, reads each frame from the received media data stored in the queue buffer 34 from a frame corresponding to the current frame position information, and controls the read frames to be input to the decoder 38. Then, the decoder 38 performs a decoding operation with respect to each of video, audio and text data. In this case, each decoder included in the decoder 38 extracts one encoded frame from encoded media data, decodes the extracted frame, and outputs the decoded frame to the multiplexer 39. Then, the multiplexer 39 multiplexes decoded data input from each decoder into one image by synchronizing each type of decoded data with each other, and outputs the multiplexed data to the display unit 40, thereby reproducing the media data.

Figure 2:
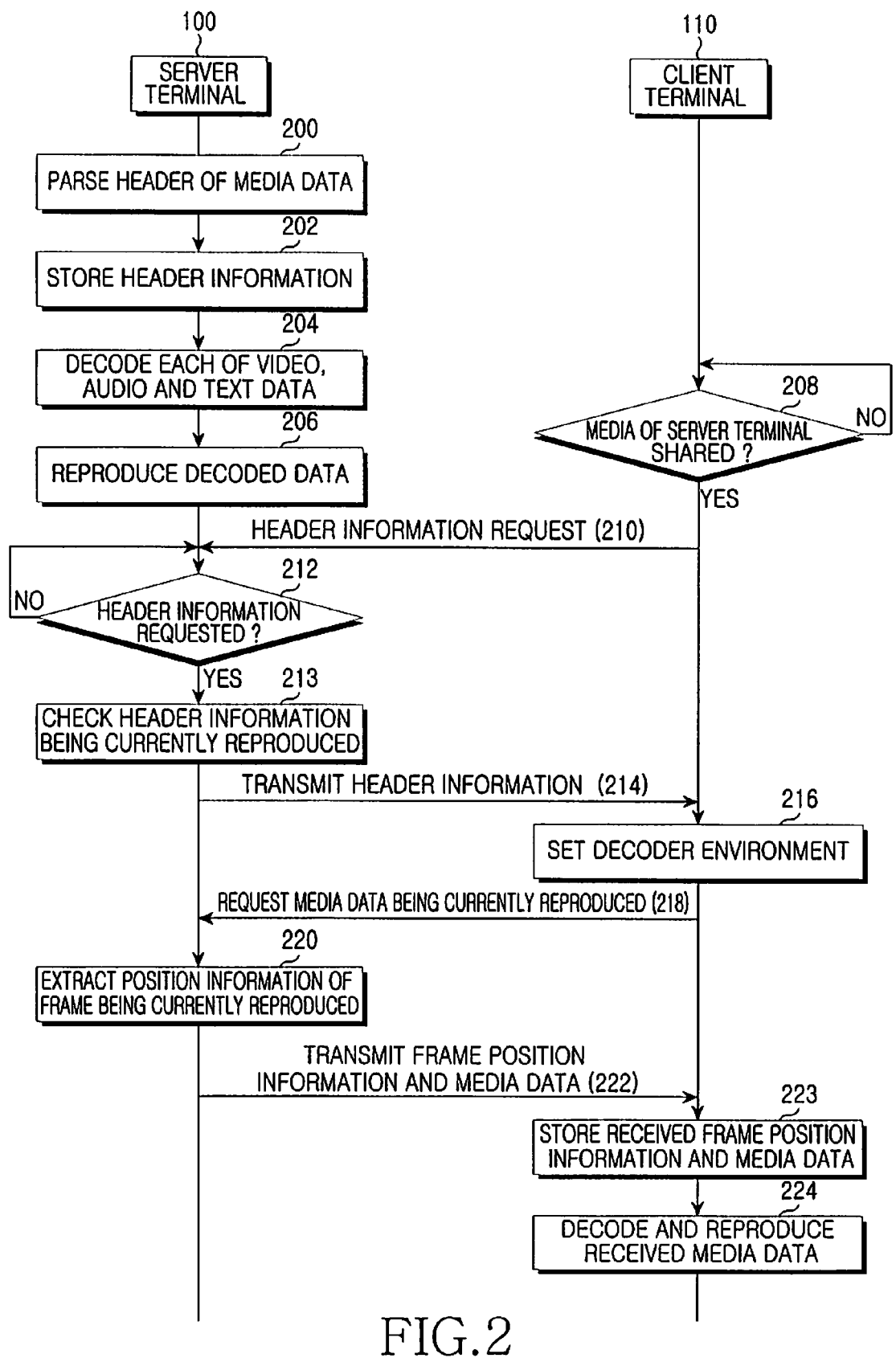
FIG. 2 is a flowchart illustrating a procedure for providing a real-time streaming service from the server terminal to the client terminal according to an exemplary embodiment of the present invention.

Hereinafter, signal flows transmitted/received for media data sharing between the server terminal 100 and client terminal 110, which have the construction as shown in FIG. 1, will be described with reference to FIG. 2. FIG. 2 is a flowchart illustrating a procedure for providing a real-time streaming service from the server terminal to the client terminal according to an exemplary embodiment of the present invention.

First, in step 200, the server terminal 100 parses header information of media data, which has either been received for provision of a streaming service or a broadcasting service, such as a DMB service or a DVB-H service, or which has been created by the server terminal 100 itself.

Then, the server terminal 100 stores the parsed header information in the queue buffer 22 in step 202, and decodes each of the video, audio and text data included in the media data in step 204. In this case, in order to decode each piece of data, the server terminal 100 checks decoder generation information included in the parsed header information, and then determines which decoding scheme is to be used to decode each of the video, audio text data. Thereafter, the server terminal 100 sets a decoder environment according to the determined decoding scheme, and then decodes each piece of the data.

In step 206, after step 204, the server terminal 100 multiplexes the decoded data to generate one image, and outputs the generated image to a screen, thereby reproducing the media data.

Meanwhile, when the user selects to share the media data being reproduced in the server terminal 100 in step 208, the client terminal 110 transmits a message for a header information request to the server terminal 100 in step 210.

Thereafter, when the server terminal 100 receives the message for the header information request in step 212, the server terminal 100 checks header information about the media data being currently reproduced through the queue buffer 22 in step 213. Next, in step 214, the server terminal 100 transmits the checked header information about the media data being currently reproduced to the client terminal 110.

Then, in step 216, the client terminal 110 checks a decoding scheme for each of video, audio and text data, which is media data to be reproduced, by using the received header information. Thereafter, the client terminal 110 sets a decoder environment to decode each piece of data according to the checked decoding scheme.

When the decoding environment has been set as described above, the client terminal 110 transmits a message requesting for the media data being currently reproduced to be sent to the server terminal 100 in step 218.

Meanwhile, when the server terminal 100 receives the message requesting the media data being currently reproduced, the server terminal 100 extracts position information about a frame being currently reproduced from the queue buffer 22 in step 220. Thereafter, in step 222, the server terminal 100 transmits the extracted frame position information and media data to the client terminal 110. In this case, the media data is transmitted in units of frames.

Then, in step 223, the client terminal 10 stores both the received position information about the frame being currently reproduced and the media data received in units of frames in the queue buffer 34. Next, in step 224, the client terminal 110 checks the frame position information, reads frames from the received media data stored in the queue buffer 34 from a frame corresponding to the frame position information, and performs a decoding operation with respect to each of video, audio and text data. Thereafter, the client terminal 110 multiplexes the decoded data into one image by synchronizing each type of decoded data with each other, and outputs the one image to a screen, thereby reproducing the same media data as the server terminal 100 at the same time.

As described above, in order to share media data between mobile terminals, a server terminal transmits the encoded data of each of pre-parsed video and audio to a client terminal, thereby significantly reducing the load imposed on the wireless interface between the terminals. Additionally, all the procedure of extracting and inserting transmission/reception media data is performed within a memory, thereby efficiently improving the performance.

While the present invention has been shown and described with reference to certain exemplary embodiments thereof, it will be understood by those skilled in the art that various changes in form and details may be made therein without departing from the spirit and scope of the invention as defined by the appended claims. While the present invention has been described in a case in which the server terminal 100 and client terminal 110 transmit/receive data wirelessly, the present invention can be applied to a case in which the server terminal 100 and client terminal 110 transmit/receive data via a wired connection. In this case, it is necessary for each terminal to include an interface for communication. Accordingly, the scope of the invention is not to be limited by the above embodiments but by the claims and the equivalents thereof.

What is claimed is:

1. A system for providing a real-time streaming service between terminals, the system comprising:
   a server terminal for parsing header information of media data, separately storing the parsed header information, checking decoder generation information included in the header information, setting a first decoder according to the decoder generation information, reproducing the media data, providing the separately-stored header information in response to a header information request for the media data being currently reproduced, and providing the media data being currently reproduced in response to a media data provision request; and a client terminal for when there is a sharing request for the media data of the server terminal by a user, requesting the header information from the server terminal, setting a second decoder according to the decoder generation information of the header information received from the server terminal, when the second decoder has been set, requesting the media data from the server terminal, and reproducing the media data provided from the server terminal through the set second decoder, wherein the server terminal extracts position information about a media frame being currently reproduced by means of the header information in response to the media data provision request, and provides the extracted media frame position information together with the media data, and upon having received the media frame position information and the media data, the client terminal stores the media frame position information and the media data, and reproduces the media data from a frame corresponding to the media frame position information by means of the media frame position information.

2. The system as claimed in claim 1, wherein the decoder generation information comprises at least one piece of information selected from a group consisting of a codec file, a frame size, a frame rate, a number of bits per pixel, and a quantization precision.

3. The system as claimed in claim 1, wherein the media data transmitted from the server terminal is provided in units of encoded frames.

4. The system as claimed in claim 1, wherein the server terminal and the client terminal have the first and second decoders, respectively, and the first and second decoders can process same file formats as each other.

5. The system as claimed in claim 1, wherein the server terminal and the client terminal have the first and second decoders, respectively, and the decoders have similar performances in a maximum number of frames that can be processed per second.

6. A method for providing a real-time streaming service between a server terminal and a client terminal in a streaming service provision system, the method comprising the steps of:

parsing, by the server terminal, header information of media data, separately storing the parsed header information, checking decoder generation information included in the header information, setting a first decoder according to the decoder generation information, and reproducing the media data;

when there is a sharing request for the media data of the server terminal by a user, transmitting, by the client terminal, a header information request to the server terminal;

providing, by the server terminal, the separately-stored header information in response to the header information request for the media data being currently reproduced;

setting, by the client terminal, a second decoder according to the decoder generation information of the header information received from the server terminal, and when the second decoder has been set, transmitting a media data provision request to the server terminal;

providing, by the server terminal, the media data being currently reproduced in response to the media data provision request; and reproducing, by the client terminal, the media data provided from the server terminal through the set second decoder, wherein the server terminal extracts position information about a media frame being currently reproduced by means of the header information upon providing the media data in response to the media data provision request, and provides the extracted media frame position information together with the media data, and in reproducing the media data through the set second decoder, when having received the media frame position information and the media data, the client terminal stores the media frame position information and the media data, and reproduces the media data from a frame corresponding to the media frame position information by means of the media frame position information.

7. The method as claimed in claim 6, wherein the decoder generation information comprises at least one piece of information selected from the group consisting of a codec file, a frame size, a frame rate, a number of bits per pixel, and a quantization precision.

* * * * *